Patented July 22, 1952

2,604,464

UNITED STATES PATENT OFFICE 2,604,464

REACTION PRODUCT OF DIPHENYLOLPROPANE DIGLYCIDYL ETHER WITH STYRENE-ACRYLIC ACID COPOLYMERS

Gordon Hart Segall and John Francis Clemow Dixon, McMasterville, Quebec, Canada, assignors to Canadian Industries Limited, Montreal, Quebec, Canada, a corporation of Canada No Drawing. Application May 31, 1951, Serial No. 229,291. In Canada March 3, 1949

10 Claims. (Cl. 260—80.5)

This invention relates to new polymeric materials and to a method of making the same. More particularly, it relates to thermoset, infusible, solvent insoluble polymers of styrene having an intermediate thermoplastic, fusible, solvent soluble stage, and to a method of making the same. Still more particularly, it relates to such polymers for use in the protective coating field.

This application is a continuation-in-part of our application Serial No. 168,146 filed on 14th June, 1950, which is itself a continuation-in-part of our application Serial No. 132,204 filed 9th December, 1949, both now abandoned.

It has heretofore been the practice to prepare thermoset, infusible, solvent insoluble polymeric materials from styrene by copolymerizing styrene with divinyl benzene. However, due to the identical activity of the vinyl bonds in the divinyl benzene, it has been impossible to obtain a thermoplastic, fusible, solvent soluble product at any stage of the copolymerization except at very low conversions. Cross-linking occurs simultaneously with linear polymerization and the end product is highly cross-linked and hence thermoset, infusible and solvent insoluble.

The production of protective coatings based on thermoset, infusible, solvent insoluble polymeric materials, for example, preferably requires that a thermoplastic, fusible, solvent soluble product be formed at an intermediate stage of the polymerization reaction. The thermoplastic product may thus be homogeneously and uniformly applied to the articles to be coated, and thereafter infusibilized and insolubilized by baking.

If, instead of divinyl benzene, a vinyl monomer containing a less active double bond, e. g. a vinyl-allyl compound, is copolymerized with styrene, it is possible, by careful control of polymerization conditions, to obtain a linear thermoplastic styrene copolymer which subsequently can be infusibilized and insolubilized by cross-linking through the allyl group. However, since an allyl group differs from a vinyl group only in the degree with which it polymerizes, it is difficult to exclude the possibility of cross-linking during the initial polymerization. Accordingly, the range of polymerization conditions is seriously limited and there is a constant danger of gelation with loss of the polymer charge.

It has now been found that if styrene is copolymerized with a certain minor amount of an acrylic acid, with or without a minor amount of another polymerizable ethylenically unsaturated compound having the ethylenic group as sole reactive group, and if the resultant copolymer is heated with diphenylolpropane diglycidyl ether under the conditions hereinafter specified, the above difficulties are completely overcome. There is first obtained a thermoplastic, fusible, solvent soluble copolymer which is substantially free of any cross-linkage and which becomes thermoset, infusible, solvent insoluble by cross-linking through its free carboxylic acid groups only upon reaction with the diphenylolpropane diglycidyl ether. Any polymerization conditions can thus be employed for preparing the thermoplastic copolymer and there is absolutely no danger of gelation occurring during the initial polymerization.

This particular type of thermoset styrene polymer has been found very suitable for use in moulding operations and in the protective coating field. Furthermore, it has been found that if a certain minor amount of a lower alkyl ester of acrylic acid is incorporated into the styrene-acrylic acid copolymer, this copolymer yields upon heating with diphenylolpropane diglycidyl ether under the conditions hereinafter specified protective coatings which are markedly superior to other known coatings based on thermoset, infusible, solvent-insoluble polymers and, more particularly, to the alkyd-type protective coatings.

In United States Patent Nos. 2,375,960 and 2,421,876 and German Patent No. 544,326, it has been proposed to copolymerize styrene with an unsaturated anhydride, such as maleic anhydride, and to infusibilize and insolubilize the resultant thermoplastic copolymer by reaction with a polyhydroxy compound, such as a glycol or glycerol. In such instances, free carboxylic acid groups are formed as a result of the cross-linking reaction, which results in alkali sensitivity of the thermoset polymers and hence of protective coatings based on these polymers, whereas in the process of the present invention, free hydroxyl groups are produced which do not affect the alkali resistance of the polymers or of the protective coatings based thereon. Furthermore, it is difficult to produce copolymers containing maleic anhydride or other unsaturated anhydride which have a wide range of composition because of the tendency of these materials to polymerize in constant proportions with other monomers. This difficulty is not encountered in the process of this invention.

French Patent No. 881,981 shows the reaction between polyepoxides and polymeric materials containing free carboxylic acid groups with resultant cross-linking of the polymeric materials. Under the conditions defined in the patent, however, the cross-linkage is not sufficiently high to impart complete infusibility and solvent insolubility to the polymeric materials and it is seen, in Example 4 of the patent for example, that these polymeric materials are still affected by the organic solvents in which they were soluble before cross-linking. Furthermore, it has been found that, even in the process of the present invention, polyepoxides such as polymeric diallyl ether monoxide are inefficient as infusibilizing and insolubilizing agents for styrene polymers containing free carboxylic acid groups although they are satisfactory for partial cross-linking of such polymers. Moreover, as above mentioned, despite the efficiency of diphenylolpropane diglycidyl ether for completely thermosetting styrene-acrylic acid copolymers under the conditions hereinafter specified and thus yielding many valuable products, the presence of a specific amount of a third component in the styrene copolymer is necessary for obtaining the superior metal finishes above referred to. The partially cross-linked polymers of French Patent No. 881,981 are very suitable for such uses as the thickening of solutions, but they are unsatisfactory for use as protective coatings and for the manufacture of moulded articles which require a high chemical inertness. The present invention provides the means whereby polymers are obtained which are completely thermoset, infusible and solvent insoluble and yet possess a definite intermediate thermoplastic, fusible and solvent soluble stage, and whereby protective coatings are also obtained which possess physical and chemical properties hitherto unknown in protective coatings based on thermoset polymeric materials.

It is therefore an object of this invention to provide new and useful polymeric materials.

Another object of this invention is to provide styrene polymers having improved properties.

A further object of this invention is to provide thermoset, infusible, solvent insoluble polymers of styrene having an intermediate thermoplastic, fusible, solvent soluble stage.

A still further object of this invention is to provide such styrene polymers for use in the protective coating field.

An additional object of this invention is to provide a method for preparing these polymers.

Other and additional objects of the invention will become apparent hereinafter.

These objects are accomplished by copolymerizing more than 50 parts of styrene with at least 5 parts of an acrylic acid, with or without another polymerizable ethylenically unsaturated compound having the ethylenic group as sole reactive group, the total parts being 100, and subsequently heating and resultant thermoplastic, fusible, solvent soluble copolymer with diphenylolpropane diglycidyl ether at a temperature of about 150° C. in the presence of at least 0.5%, by weight of the copolymer, of an organic basic catalyst selected from the group consisting of amines and quaternary ammonium compounds.

By copolymerizing more than 50 parts of styrene with at least 5 parts of an acrylic acid and at least 15 parts of a lower alkyl ester of acrylic acid, the total parts being 100, and subsequently heating the resultant thermoplastic copolymer with diphenylolpropane diglycidyl ether under the conditions above defined, protective coatings are obtained which possess physical and chemical properties hitherto unknown in protective coatings based on thermoset polymeric materials.

The details and manner of practising the invention will be apparent by reference to the following specific examples, it being understood that these examples are merely illustrative embodiments of the invention and that the scope of the invention is not limited thereto.

*Example 1*

A solution of a 95% styrene-5% acrylic acid copolymer was prepared by dissolving 47.5 parts of styrene and 2.5 parts of acrylic acid in 25 parts of amyl acetate and 25 parts of high boiling aromatic hydrocarbon, and heating at 90° C. for 16 hours in the presence of 1 part of benzoyl peroxide.

To 5 parts of the above solution, there was added 0.625 part of diphenylolpropane diglycidyl ether (prepared by interaction of phenol with acetone in the presence of an acid catalyst, followed by reaction with an excess of epichlorohydrin in the presence of aqueous caustic) together with 0.05 (2% by weight of the copolymer) of trimethylbenzyl ammonium acetate, and a film was cast therefrom. After heating at 150° C. for 30 minutes, the film was insoluble in acetone which is a solvent for the initial styrene copolymer.

Similar results were obtained by use of diethylene triamine and piperidine instead of trimethylbenzylammonium acetate.

A copolymer of styrene and acrylic acid containing less than 5% acrylic acid would not yield an acetone-insoluble film under the above treatment.

*Example 2*

A solution of a 85% styrene-15% acrylic acid copolymer was prepared by dissolving 430 parts of styrene and 76 parts of acrylic acid in a mixture of 253 parts of amyl acetate and 253 parts of high boiling aromatic hydrocarbon, and heating at 90° C. for 24 hours in the presence of 10.12 parts of benzoyl peroxide.

Ethyl acetate was added to the above copolymer solution so as to make a solution containing 3 parts of amyl acetate, 1 part of high boiling aromatic hydrocarbon and 1 part of ethyl acetate. 8 parts of this solution were then mixed with 2 parts of diphenylolpropane diglycidyl ether and 1%, by weight of the copolymer, of piperidine, and a film was cast therefrom on base steel. After heating at 150° C. for 30 to 40 minutes, this film was insoluble in acetone.

*Example 3*

127.5 parts of styrene and 22.5 parts of methacrylic acid in 100 parts of methyl ethyl ketone and 50 parts of xylene were copolymerized by heating at 90° C. for 24 hours in the presence of 3 parts of benzoyl peroxide. There was thus obtained a solution of a copolymer containing 85% styrene and 15% methacrylic acid.

To 5 parts of the above solution, there was added 0.45 parts of diphenylolpropane diglycidyl ether together with 0.025 parts (1% by weight of the copolymer) of piperidine and a film was cast therefrom. After heating at 150° C. for 1.5 hours, this film was insoluble in acetone.

*Example 4*

127.5 parts of styrene and 22.5 parts of methacrylic acid were copolymerized in 100 parts of methyl ethyl ketone and 50 parts of xylene by heating at 90° C. for 24 hours in the presence of 3 parts of benzoyl peroxide.

5 parts of the copolymer solution were then mixed with 0.625 part of diphenylolpropane diglycidyl ether and 0.025 parts (1% by weight of the copolymer) of trimethylbenzylammonium acetate and a film was cast from the solution. After heating at 150° C. for 20 minutes, the film was insoluble in acetone.

*Example 5*

720 parts of styrene, 200 parts of methyl acrylate and 80 parts of acrylic acid were dissolved in 1000 parts of xylene and heated for 18 hours at 90° C. in the presence of 20 parts of benzoyl peroxide. This resulted in a 72% styrene-20% methyl acrylate-8% acrylic acid copolymer solution containing 50% total solids.

To 1600 parts of this solution were added 200 parts of diphenylolpropane diglycidyl ether and 10 parts of trimethylbenzylammonium acetate.

An enamel was prepared by dispersing 1000 parts of titanium dioxide pigment in a roller mill in a portion of the above mixture and after complete dispersion, the remainder of the mixture was added and thoroughly mixed.

This composition, when applied to a rigid steel surface and baked for 60 minutes at 150° C., produced a high gloss white enamel coating having an excellent flexibility and durability and having a water, alkali, grease and organic solvent resistance superior to that of the alkyd-type coatings.

*Example 6*

A white enamel composition was prepared following the procedure outlined in Example 5. Prior to the application of the enamel to a metal surface, 0.25% of polymerized ethylene was added as a 10% solution in toluene. This produced a finish with improved mar resistance in addition to the desirable features referred to in the preceding example.

*Example 7*

A copolymer containing 85% styrene, 10% methyl acrylate and 5% acrylic acid was prepared by heating 42.5 parts of styrene with 5 parts of methyl acrylate and 2.5 parts of acrylic acid in 50 parts of toluene containing 1 part of benzoyl peroxide, at 90° C. for 18 hours.

To 5 parts of the above solution, there was added 0.625 part of diphenylolpropane diglycidyl ether together with 0.025 part (1% by weight of the copolymer) of trimethylbenzyl ammonium acetate and a film was cast therefrom. After heating at 150° C. for 30 minutes, this film had a chemical inertness similar to that of the film obtained in Example 5 but it was more brittle than that film or similar films obtained from alkyd-type resins.

*Example 8*

8.74 parts of styrene, 1.88 parts of methyl acrylate and 1.88 parts of acrylic acid in 25.5 parts of methyl ethyl ketone and 12.5 parts of xylene were copolymerized by heating at 90° C. for 24 hours in the presence of 0.25 part of benzoyl peroxide. There was thus obtained a solution of a copolymer containing 70% styrene, 15% methyl acrylate and 15% acrylic acid.

5 parts of this solution were mixed with 0.8 part of diphenylolpropane diglycidyl ether and 0.01 part (0.8% by weight of the copolymer) of piperidine and a film was cast from the solution. After heating at 150° C. for one hour, the film had the same properties as the film obtained in Example 5.

Similar results were obtained by using 0.5% (by weight of the copolymer) of piperidine instead of 0.8%. However, use of less than 0.5% would not yield an insoluble film.

*Example 9*

8.74 parts of styrene, 1.88 parts of acrylonitrile and 1.88 parts of acrylic acid in 25.5 parts of methyl ethyl ketone and 12.5 parts of xylene were copolymerized by heating at a temperature of 90° C. for 24 hours using 0.25 part of benzoyl peroxide catalyst. There was thus obtained a solution of a 70% styrene-15% acrylonitrile-15% acrylic acid copolymer.

To 5 parts of the above solution, there was added 0.8 part of diphenylolpropane diglycidyl ether together with 0.01 part (0.8% by weight of the copolymer) of piperidine and a film was cast therefrom on autobody steel panels. After heating at 150° C. for one hour, the film was insoluble in acetone.

The above-detailed examples illustrate certain embodiments of the invention wherein there are completely infusibilized and insolubilized specific styrene copolymers containing specific acrylic acids, with or without specific polymerizable ethylenically unsaturated compounds having the ethylenic group as sole reactive group. The present invention, however, is not restricted to such specific acids and compounds.

The acrylic acids which can be incorporated into the styrene copolymers include such acids as acrylic acid, haloacrylic acids, methacrylic acid and crotonic acid.

The ethylenically unsaturated compounds include any such compounds provided only that they are polymerizable and contain the ethylenic group as sole reactive group. Illustrative compounds which can be used are acrylic, haloacrylic, methacrylic esters and nitriles, such as, for example, acrylonitrile, methyl methacrylate, butyl methacrylate, octyl methacrylate, methoxymethyl methacrylate, chloroethyl methacrylate, and the corresponding esters of acrylic acid alpha-chloroacrylic acids; vinyl and vinylidene halides, e. g. vinyl chloride, vinyl fluoride, vinylidene chloride, vinylidene fluoride; vinylcarboxylates, e. g. vinyl acetate, vinyl chloroacetate vinyl propionate and vinyl stearate; vinyl aryls, e. g. vinylnaphthalene; methyl vinyl ketone, etc.

The lower alkyl esters of acrylic acid which are necessary for the obtention of the above-mentioned superior protective coatings include such esters as methyl acrylate, ethyl acrylate, propyl acrylate and butyl acrylate.

For the preparation of the thermoplastic, fusible, solvent soluble styrene copolymers, any of the well-known processes for the copolymerization of styrene can be used. The previous examples illustrate a solution copolymerization method which is preferable when it is desired to thermoset the copolymers as protective coatings.

For optimum results, the diphenylolpropane diglycidyl ether should be present in an amount of one mol for each two free carboxylic acid groups of the thermoplastic copolymers to be used in the cross-links.

Any organic amine or quaternary ammonium compound can be used as a catalyst for the infusibilization and insolubilization of the thermoplastic styrene copolymers. Examples of such suitable catalysts are pyridine, piperidine, dimethyl aniline, diethylene triamine, tetramethylammonium chloride, trimethylbenzylammonium acetate, etc. in the proportion of 0.5–2.0% by weight of the thermoplastic copolymer to be infusibilized and insolubilized.

In the example of the pigmented composition described above, titanium dioxide was used as the pigment constituent. Other pigments may also be used in the compositions either alone or in admixture to produce enamels of various colours. These compositions are, however, of particular value when produced with white pigments since they are highly resistant to yellowing on baking.

As shown in the foregoing examples, the infusibilization and insolubilization can be obtained in articles produced from a solution containing a common solvent for and in which the thermoplastic, fusible, solvent soluble copolymer and the diphenylolpropane diglycidyl ether are compatible. Such solvents include, for example, esters, ketones and mixtures of hydrocarbons with esters and/or ketones. However, the infusibilization and insolubilization can be conducted also on a preformed thermoplastic, fusible, solvent soluble polymeric article.

The invention provides a simple and easily-controlled process for obtaining thermoset, infusible, solvent insoluble polymers of styrene having an intermediate thermoplastic, fusible, solvent soluble stage. The process does not give rise to the formation of undesirable by-products, the thermoset polymeric product finally obtained being free of undesirable substances.

The thermoset, infusible, solvent insoluble styrene polymers of this invention are adapted for a wide variety of uses. For example, they are suitable as adhesives, laminates, protective coatings and for the production of moulded plastic articles and like outlets having a high chemical inertness. Plasticizers, pigments, dyes, reinforcing agents and like materials commonly used in formulating polymeric compositions can be used.

As above mentioned, some of the thermoset polymers of this invention yield protective coatings having physical and chemical properties hitherto unknown in protective coatings based on thermoset polymeric materials.

Since it is obvious that many changes and modifications can be made in the above-described details without departing from the nature and spirit of the invention, it is to be understood that the invention is not to be limited thereto except as set forth in the appended claims.

Having thus described our invention, what we claim is:

1. A process for the preparation of thermoset, infusible, solvent insoluble polymers of styrene, which comprises heating a thermoplastic, fusible, solvent soluble copolymer containing essentially more than 50 parts of styrene and at least 5 parts of an acid selected from the group consisting of acrylic acid and methacrylic acid, the total parts being 100, with one mol of diphenylolpropane diglycidyl ether for each two free carboxylic acid groups of the copolymer, at a temperature of about 150° C. and in the presence of at least 0.5%, by weight of the copolymer, of an organic basic catalyst selected from the group consisting of amines and quaternary ammonium compounds.

2. A process for the preparation of thermoset, infusible, solvent insoluble polymers of styrene, which comprises heating a thermoplastic, fusible, solvent soluble copolymer of from 70 to 95 parts of styrene and from 5 to 15 parts of an acid selected from the group consisting of acrylic acid and methacrylic acid and from 0 to 20 parts of another polymerizable monoethylenically unsaturated compound having the ethylenic group as sole reactive group, the total parts being 100, with one mol of diphenylolpropane diglycidyl ether for each two free carboxylic acid groups of the copolymer at a temperature of about 150° C. and in the presence of at least 0.5%, by weight of the copolymer, of an organic basic catalyst selected from the group consisting of amines and quaternary ammonium compounds.

3. A process for the preparation of thermoset, infusible, solvent insoluble polymers of styrene suitable as protective coatings, which comprises heating a thermoplastic, fusible, solvent soluble copolymer of more than 50 parts of styrene and at least 5 parts of an acid selected from the group consisting of acrylic acid and methacrylic acid and at least 15 parts of a lower alkyl ester of acrylic acid, the total parts being 100, with one mol of diphenylolpropane diglycidyl ether for each two free carboxylic acid groups of the copolymer, at a temperature of about 150° C. and in the presence of at least 0.5%, by weight of the copolymer, of an organic basic catalyst selected from the group consisting of amines and quaternary ammonium compounds.

4. A process for the preparation of thermoset, infusible, solvent insoluble polymers of styrene suitable as protective coatings, which comprises heating a thermoplastic, fusible, solvent soluble copolymer of from 70 to 80 parts of styrene and from 5 to 15 parts of an acid selected from the group consisting of acrylic acid and methacrylic acid and from 15 to 20 parts of a lower alkyl ester of acrylic acid, the total parts being 100, with one mol of diphenylolpropane diglycidyl ether for each two free carboxylic acid groups of the copolymer, at a temperature of about 150° C. and in the presence of at least 0.5%, by weight of the copolymer, of an organic basic catalyst selected from the group consisting of amines and quaternary ammonium compounds.

5. A process for the preparation of thermoset, infusible, solvent insoluble polymers of styrene suitable as protective coatings, which comprises heating a thermoplastic, fusible, solvent soluble copolymer of 72 parts of styrene and 8 parts of acrylic acid and 20 parts of methyl acrylate, with one mol of diphenylolpropane diglycidyl ether for each two free carboxylic acid groups of the copolymer, at a temperature of about 150° C. and in the presence of at least 0.5%, by weight of the copolymer, of an organic basic catalyst selected from the group consisting of amines and quaternary ammonium compounds.

6. Thermoset, infusible, solvent insoluble polymers of styrene as prepared by the process set forth in claim 1.

7. Thermoset, infusible, solvent insoluble polymer of styrene as prepared by the process set forth in claim 5.

8. A coating composition adapted for being hardened into an infusible, solvent insoluble, grease and alkali resistant film on baking at a temperature of about 150° C. after application, comprising essentially a linear thermoplastic copolymer of more than 50 parts of styrene and at least 5 parts of an acid selected from the group consisting of acrylic acid and methacrylic acid and at least 15 parts of a lower alkyl ester of acrylic acid, the total parts being 100, in admixture with one mol of diphenylolpropane diglycidyl ether for each two free carboxylic acid groups of the copolymer and at least 0.5%, by weight of the copolymer, of an organic basic catalyst selected from the group consisting of amines and quaternary ammonium compounds.

9. A coating composition adapted for being hardened into an infusible, solvent insoluble, grease and alkali resistant film on baking at a temperature of about 150° C. after application, comprising essentially a linear thermoplastic copolymer of from 70 to 80 parts of styrene and from 5 to 15 parts of an acid selected from the group consisting of acrylic acid and methacrylic acid and from 15 to 20 parts of a lower alkyl ester of acrylic acid, the total parts being 100, in admixture with one mol of diphenylolpropane diglycidyl ether for each two free carboxylic acid groups of the copolymer and at least 0.5%, by weight of the copolymer, of an organic basic catalyst selected from the group consisting of amines and quaternary ammonium compounds.

10. A coating composition adapted for being hardened into an infusible, solvent insoluble, grease and alkali resistant film on baking at a temperature of about 150° C. after application, comprising essentially a linear thermoplastic copolymer of 72 parts of styrene and 8 parts of acrylic acid and 20 parts of methyl acrylate, in admixture with one mol of diphenylolpropane diglycidyl ether for each two free carboxylic acid groups of the copolymer, and at least 0.5%, by weight of the copolymer, of an organic basic catalyst selected from the group consisting of amines and quaternary ammonium compounds.

GORDON HART SEGALL.
JOHN FRANCIS CLEMOW DIXON.

REFERENCES CITED

The following references are of record in the file of this patent:

UNITED STATES PATENTS

| Number | Name | Date |
|---|---|---|
| 2,131,120 | Schlack | Sept. 27, 1938 |
| 2,527,806 | Foster | Oct. 31, 1950 |
| 2,530,983 | Minter | Nov. 21, 1950 |